June 21, 1938.    R. L. ANDERSON    2,121,677
LICENSE PLATE HOLDER
Filed May 10, 1937
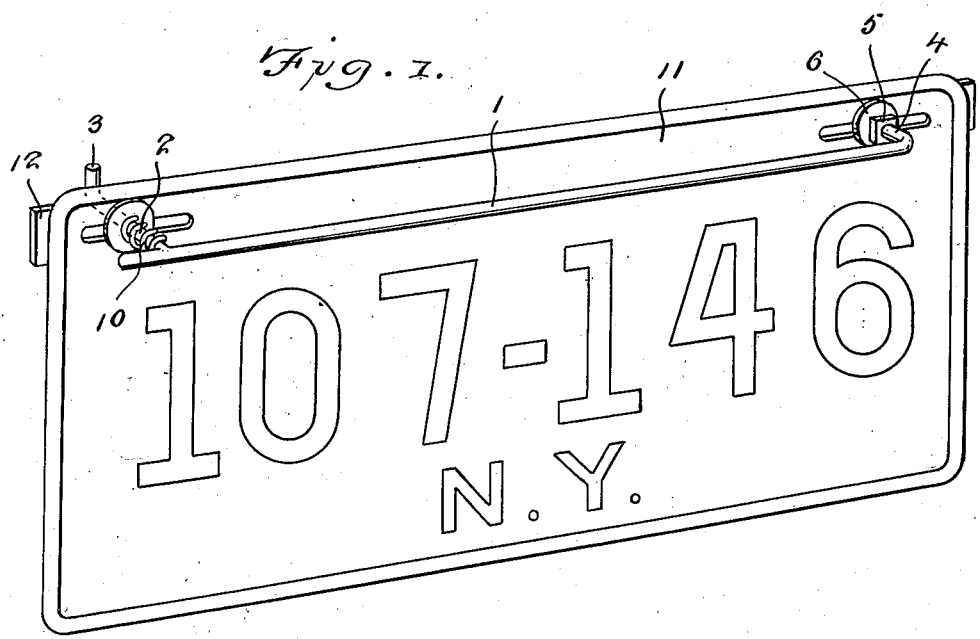
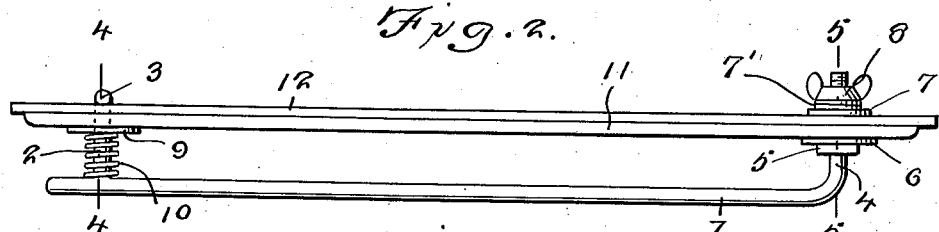
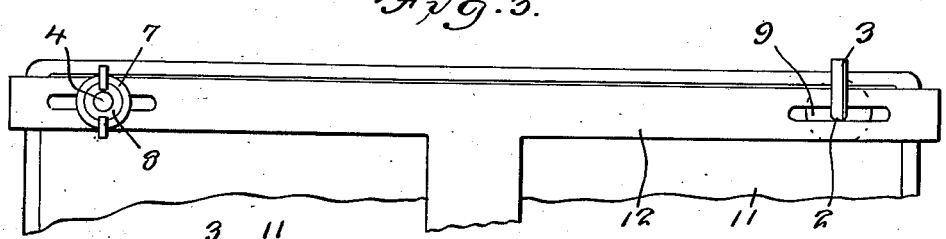
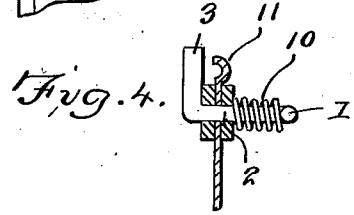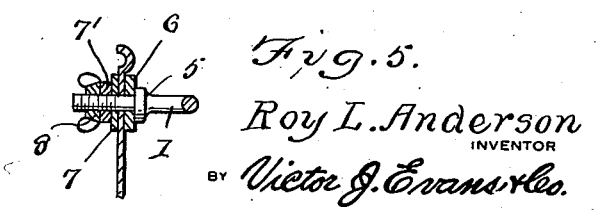
Roy L. Anderson
INVENTOR
BY Victor J. Evans & Co.
ATTORNEYS Patented June 21, 1938

2,121,677

UNITED STATES PATENT OFFICE 2,121,677

LICENSE PLATE HOLDER

Roy L. Anderson, Decorah, Iowa

Application May 10, 1937, Serial No. 141,828

1 Claim. (Cl. 40—125)

This invention relates to license plate holders for automobiles and has for the primary object the provision of a device of this character which will efficiently secure the license plate on a bracket of an automobile and hold or support the plate against rattling, and eliminates the use of bolts or like fasteners frequently employed for securing license plates in position and will permit easy and quick removal of the license plate when desired.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view showing a license plate holder constructed in accordance with my invention.

Figure 2 is a top plan view illustrating the same.

Figure 3 is a fragmentary rear elevation illustrating the device.

Figure 4 is a sectional view taken on the line 4—4 of Figure 2.

Figure 5 is a sectional view taken on the line 5—5 of Figure 2.

Referring in detail to the drawing, the numeral 1 indicates a rod which has formed thereon an extension 2 provided with an angularly related end portion 3. The extension 2 extends at right angles to the rod and is located adjacent one end of said rod. The other end of the rod is bent at right angles and screw threaded to form an extension 4. A stop 5 is threaded on the extension 4 and is engaged by a washer 6. Also mounted on the extension 4 is a washer 7 and a lock nut 7' engaged by a nut 8 threaded on said extension 4. A washer 9 is mounted on the extension 2 and also mounted on said extension between the washer 9 and the rod 1 is a coil spring 10.

In use, the extension 2 is passed through a slot in a license plate 11 and also through an opening in a supporting bracket 12. The spring 10 forces the washer 9 against the license plate and which brings about forcing of the license plate against the bracket 12, the portion 3 of the extension engaging one of the faces of the bracket 12. After the application of the extension to the license plate and bracket as described, the extension 4 is passed through another slot of the license plate and through another opening in the bracket 12, with the washer 6 engaging the license plate. The washer 7 is placed on the extension 4 against the bracket, lock nut 7' secured against the washer 7 and the nut 8 turned against the lock nut 7' thereby efficiently securing the license plate on the bracket 12 against accidental movement and against rattling.

What is claimed is:

A device of the character described, comprising, in combination, a license plate bracket formed with a pair of slots, a license plate formed with a pair of slots in registery with said first mentioned slots, and a license plate holder for securing said plate to said bracket and comprising a rod, one end of said rod inflected to form a right angularly disposed extension extending through one pair of registering slots, means on said extension engaging said plate, a nut on said extension engaging said bracket and coacting with said means for clamping said plate to said bracket, the opposite end of said rod formed with a right angularly disposed extension adjacent said opposite end and extending through another pair of registering slots, said last mentioned extension fashioned with a right angularly extending offset end engaging said bracket, a washer on said last mentioned extension engaging said plate, and a coil spring on said last mentioned extension engaging said washer in a manner whereby said washer coacts with said end to maintain said plate in clamped condition on said bracket, said first mentioned extension and associated parts coacting with said second mentioned extension and associated parts to maintain said rod in fixed position relative to said plate whereby to prevent disengagement of said second mentioned extension from said plate and bracket while said first mentioned extension is secured to said plate and bracket in clamped condition.

ROY L. ANDERSON.